April 8, 1947. E. E. TURNER, JR 2,418,490
DISTANCE AND DIRECTION MEASURING SYSTEM
Filed June 15, 1943 5 Sheets-Sheet 1

INVENTOR.
EDWIN E. TURNER, JR.
BY
HIS ATTORNEY

April 8, 1947.    E. E. TURNER, JR    2,418,490
DISTANCE AND DIRECTION MEASURING SYSTEM
Filed June 15, 1943    5 Sheets-Sheet 3

INVENTOR.
EDWIN E. TURNER, JR.
BY
HIS ATTORNEY

April 8, 1947. E. E. TURNER, JR 2,418,490
DISTANCE AND DIRECTION MEASURING SYSTEM
Filed June 15, 1943

INVENTOR.
EDWIN E. TURNER, JR.
BY
HIS ATTORNEY

April 8, 1947.   E. E. TURNER, JR   2,418,490
DISTANCE AND DIRECTION MEASURING SYSTEM
Filed June 15, 1943   5 Sheets-Sheet 5

INVENTOR
EDWIN E. TURNER, JR.

BY

ATTORNEY

Patented Apr. 8, 1947

2,418,490

UNITED STATES PATENT OFFICE 2,418,490

DISTANCE AND DIRECTION MEASURING SYSTEM

Edwin E. Turner, Jr., West Roxbury, Mass., assignor, by mesne assignments, to Submarine Signal Company, Boston, Mass., a corporation of Delaware Application June 15, 1943, Serial No. 490,930

4 Claims. (Cl. 177—386)

The present invention relates to a ranging system principally in the employment of compressional waves and is particularly applicable for plotting the relative position of an unknown object which may be moving and the course of the observing station if that is moving also.

The present invention is applicable for navigation purposes and is particularly useful for military purposes in the art of detecting and following the course of a submarine. For this purpose the invention may employ acoustic energy in the sonic or supersonic range in the subaqueous medium.

One of the chief difficulties encountered in the present echo ranging systems is that considerable time is required to range or search the necessary critical arc in which enemy submarines may lie. When the position and range of the target or obstacle are unknown, not only must a large angle be searched, but also the area for a great depth, necessitating longer intervals between successive rangings in order to permit the sound waves to return from the greatest distance for which the observation is being made. In addition to these factors, the human factor also enters into the picture of sound ranging. Some operators require longer intervals than others to make observations. The fatigue and error are also involved in the human element. An operator is apt, after repeated operations, to lose some of his alertness and not recognize echoes which might indicate the presence of submarines. This is particularly true in sounding systems where reverberations are present and listened to during each ranging signal.

The present system uses as a feature of the invention a plotting arrangement whereby a permanent record is made both of the observing or searching vessel and of the target being observed. This is accomplished in the present invention through the use of a recording sheet in which the position of the observing or search vessel is recorded every time a ranging signal is emitted or the course of the vessel may be continuously traced on the recording paper. The recording paper also carries an indication or record of the position of the target. In accomplishing these results a recording element is moved and turned over the recording paper in a continuous course following the position of the observing vessel. The indicating element at the same time has a member continually directed in the direction from which sound waves are reflected from the object and is also provided with means whereby the distance of the reflecting object is recorded. These results are accomplished by means and methods new in the art of sound ranging and are particularly useful and advantageous in the present system because of the flexibility of the operating elements.

The present system may also employ an amplitude modulated carrier wave varying over a narrow frequency band in a continuous fashion, whereby the distance measurement is established as a function of the magnitude of the modulating frequency, and the errors in magnitudes of the resultant frequency observed, normally brought about through the Doppler effect because of the motions of the reflecting objects, are eliminated.

The present invention has particular advantage when used as an automatic device for automatically searching and plotting the area surrounding the vessel as the vessel moves through the water.

Without further describing the merits and advantages of the present invention, the invention will now be described in connection with an embodiment of the same as illustrated by drawings in which Fig. 1 shows the system in a block diagram;

Figure 1:
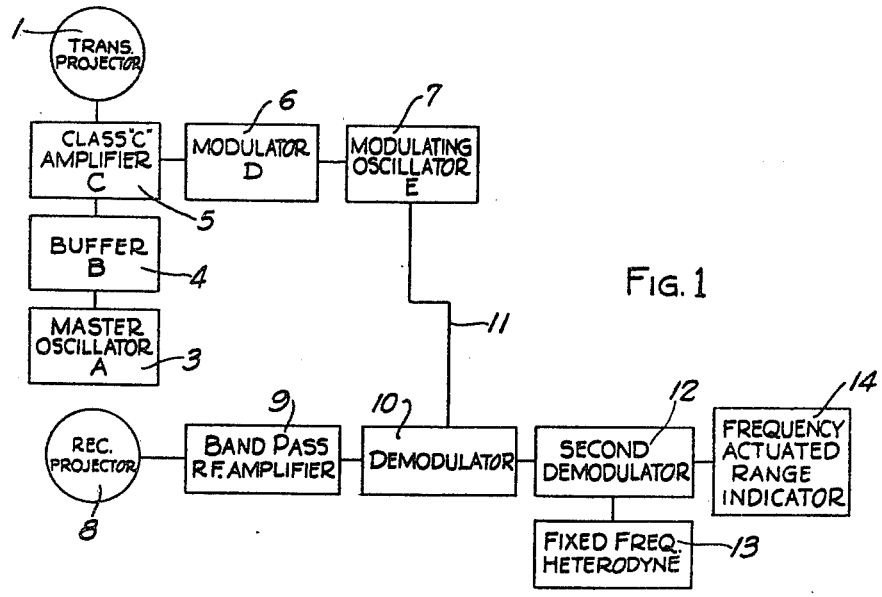
Figure 9:
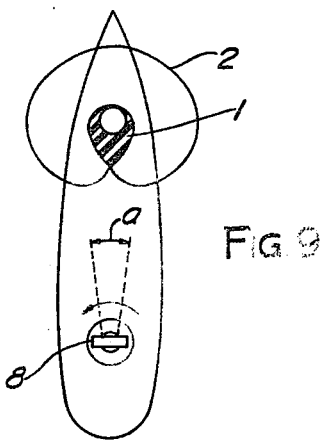
Fig. 9 illustrates diagrammatically the position of the apparatus on a vessel.

In the arrangement shown in Fig. 1, I represents the transmitting projector which may be of the supersonic, magnetostriction, piezoelectric or dynamic type and may produce a compressional wave radiation with a directivity pattern as shown by 2, Fig. 9. The frequency may be of any desired value, as, for instance, 12,500 cycles, 20,000 cycles or higher and lower frequencies. A driving circuit illustrated by the block diagrams in Fig. 1 may be used comprising a master oscillator 3, a buffer amplifier 4 from which the energy is impressed on an amplifier 5 of the class C type, the grid control tube of which may be modulated from a low frequency modulator 6 which may modulate over a range progressively from 100 to 200 cycles. The modulator 6 may be energized through a modulating oscillator 7 whose frequency will be varied in a constant continuous fashion between the desired oscillating frequencies. The result of this combination as applied to the transmitting projector 1 is that the carrier wave, if transmitted, for instance, at 12,500 cycles, will be constantly modulated with a uniform progressive rate over the modulating band. If the band modulates between 100 and 200 cycles, then the higher side band would be 12,600 to 12,700 cycles and the lower side band would be 12,300 to 12,400 cycles, the period between the extreme variations being the cycle of the modulator itself which may be one second or two seconds or more or less, depending upon the distance range with which the system is to be operated, as will be explained later.

The transmitting projector could be operated continuously or it could be operated for a given time interval and then remain silent. The receiving projector 8, however, may be rotated at a constant rate and be directively sensitive within a small angular opening in which case the direction in which the receiving projector faces when a reflected sound is picked up will also indicate the direction of the reflecting source. For this purpose the motion of the indicating element, as will be explained later, is synchronized with the facing of the direction of the projector to indicate the direction from which the source of sound has been received.

The receiving projector 8 in the block diagram system of Fig. 1 will impress its reflected wave on a band pass high-frequency amplifier 9 which is connected to a demodulator detector 10 in which the received energy is mixed through the connection 11 from the modulating oscillator with the modulating oscillator frequency. The output of this mixed combination is then demodulated by a second demodulator detector 12 with the aid of a fixed heterodyne oscillator 13 so that the frequency remaining for operating the range indicator 14 is a frequency between 100 to 200 cycles or thereabouts. This frequency may vary from the expected value due to the Doppler effect, as will be presently explained, because of the relative motion of the reflected source and observing station.

Consideration of the operation of the system described will show that the frequency of modulation of the carrier being received by the receiving projector at any instant will in general be different from the frequency of the modulating oscillator 7 at the same instant by a function dependent upon the time required for the energy leaving the transmitting projector to reach the target or reflecting surface and be returned to the receiving projector 8. This frequency difference will be proportional to the distance travelled by the sound in going from the transmitting projector to the receiving projector if the modulating oscillator 7 varies in accordance with a linear function.

For purposes of example, let it be supposed that a maximum range indication of 800 yards is desired. Let it further be assumed that a carrier frequency is fixed at 12,500 cycles per second and that the modulating oscillator 7 generates a frequency varying linearly with time between 100 and 200 cycles in one second; the cycle of operation being assumed to commence at 100 cycles and increase to 200 cycles in one second and then track back to 100 cycles in the following second. Under such conditions at the beginning of the considered time interval the upper side band will be 12,600 cycles and the lower side band 12,400 cycles. At the end of the time interval, that is one second later, the upper side band would be 12,700 cycles and the lower side band 12,300 cycles. If a reflecting target is assumed at 800 yards distance and that the speed of sound in water is one second to the target and back for this distance (an assumption that sound travels 4800 feet per second in water, which is approximately correct), then at the time that the signal is being received, the transmitting projector will be sending into the water the frequencies as indicated for the end of the period as above set forth.

The resultant frequency produced by the second demodulator 12 from the combination above set forth would be, except for the fixed frequency heterodyne oscillator 13, 100 cycles, the difference between the upper or lower side band frequencies which are exactly 100 cycles for the range of 800 yards. For zero distance, it is, of course, obvious that the receiving frequency and transmitting frequencies will be the same and therefore the indication produced by 12 would be a zero beat note. Since it is difficult to work with frequencies approaching zero in an indicating system, the fixed frequency heterodyne 13 is used to raise the resultant beat oscillator signal a constant amount. If the oscillator 13 is fixed at 200 cycles and if the beat difference frequency is used, then the indicator 14 will operate over a range from 100 to 200 cycles, the 200 cycle note being the zero distance measured and the 100 cycle note being the maximum scale reading of 800 yards.

The reason for employing an amplitude modulated carrier wave rather than varying the frequency of the carrier itself, is because the method according to this invention will reduce to insignificance for substantially all cases errors of substantial proportions which would be present because of the Doppler effect if the carrier frequency itself were varied. The usual calculation for the Doppler effect indicates that a maximum variation of about 3% of the frequency of the radiated sound may be obtained under worst possible conditions, namely when the target or object being searched and the attacking or searching vessels are approaching each other in a direct line at maximum speeds.

If a system were used in which the carrier frequency were varied under such conditions, the error due to the Doppler effect may be large for high speeds of the vessels. As an example, if the carrier frequency above assumed, namely, 12,500 cycles, were varied between limits equal to ±½ the carrier frequency, that is from 6250 cycles to 18,750 cycles, the error in frequency range, due to the Doppler effect may be of sufficient magnitude to make the method of observation useless.

The change in frequency due to the Doppler effect in making observations on a moving reflecting source may be determined by the following equation:

$$f' = f\left(1 + 2\frac{(V_1 + V_2)}{a}\right)$$

where $V_1$ and $V_2$ are the velocities, respectively, in the direction of approach of the observing station and the reflecting station to one another and $a$ is the velocity of the sound in the propagating medium. $f$ is the frequency of the sound source and $f'$ is the observed frequency at the receiving station after reflection from the reflecting source. The increase in frequency $\Delta f$ is $$\Delta f = (f' - f) = \frac{2f(V_1 + V_2)}{a}$$

If, therefore, the carrier frequency alone is varied, the frequency returning after reflection may differ from the transmitting frequency between values computed on the basis of $f$ being 6250 cycles and 18,750 cycles. Assume, for instance, that the speed of approach of the two vessels is 48 feet per second, which is approximately 30 knots, and that the velocity of sound is 4800 feet per second, then the factor $$2\frac{V_1 + V_2}{a} = .02$$

and $\Delta f$ may therefore vary from 125 cycles to 375 cycles in any range measurement. If the same maximum range of 800 yards, as previously set forth, is assumed for the operation of the apparatus which corresponds to one second of time between the sending out of the direct sound and the return of the reflected echo, then the frequency variation on which the basis of distance is measured would be 12,500 cycles which is the frequency variation during the one second interval. The Doppler error, therefore, for this distance would range between 125 cycles and 375 cycles, the minimum error being 1% and the maximum error being 3%. The chief point to note in the method using a straight carrier frequency variation is that the Doppler error varies as much as 250 cycles for a given condition of vessels' speeds.

In the present system it is to be noted that the frequency being sent out includes the carrier and at least one side band although both may be used. Assume, as previously described, that in the time interval of one second the upper side band varies between 12,600 cycles and 12,700 cycles and that the Doppler factor is .02 as set forth in the illustration where the carrier frequency alone is transmitted. Under these conditions the upper side band Doppler effect may vary between 252 cycles and 254 cycles providing a net variation of two cycles in the entire operation.

If no side band is used therefore in the illustrations given the Doppler effect may cause variations of 125 to 375 cycles while when using a side band this same effect is reduced to two cycles. It will be evident, therefore that if no side band is used, in order to obtain results within the same error of observation that are obtained when a side band is used, the whole carrier frequency magnitude must necessarily be used. In other words the frequency received must be compared with the frequency transmitted and the total difference measured, which would mean not only a transmitter but also a receiver and an indicator responsive over a 12,500 cycle range rather than over a 100 cycle range, which would make a very difficult construction.

If the carrier were varied in frequency over a narrow range say from 12,400 to 12,600 cycles, the Doppler effect would vary between 248 and 252 cycles or more than the indicator range. An indicator responsive over a 200 cycle range would then be of no utility.

Figure 3:
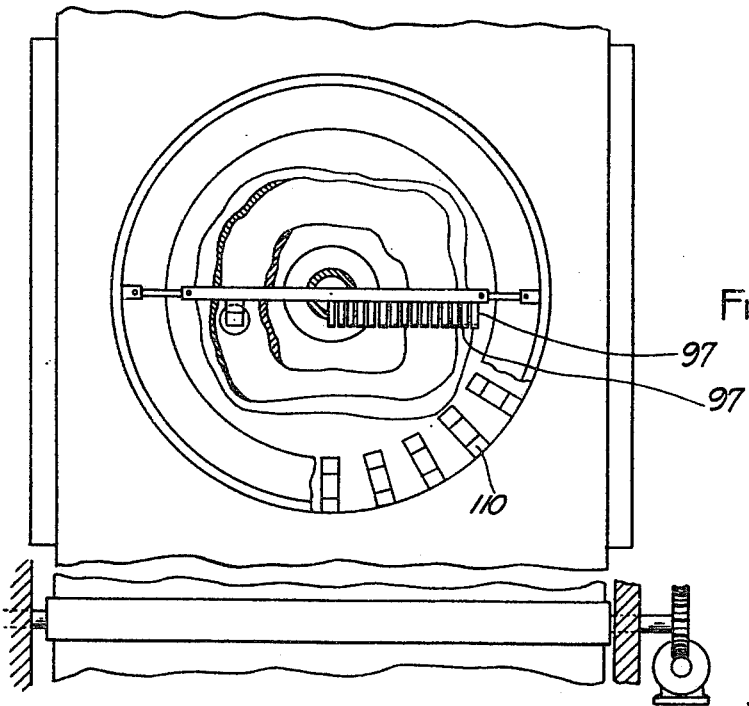
Fig. 3 shows a plan view of a portion of the device indicated in Fig. 2.
Figure 2:
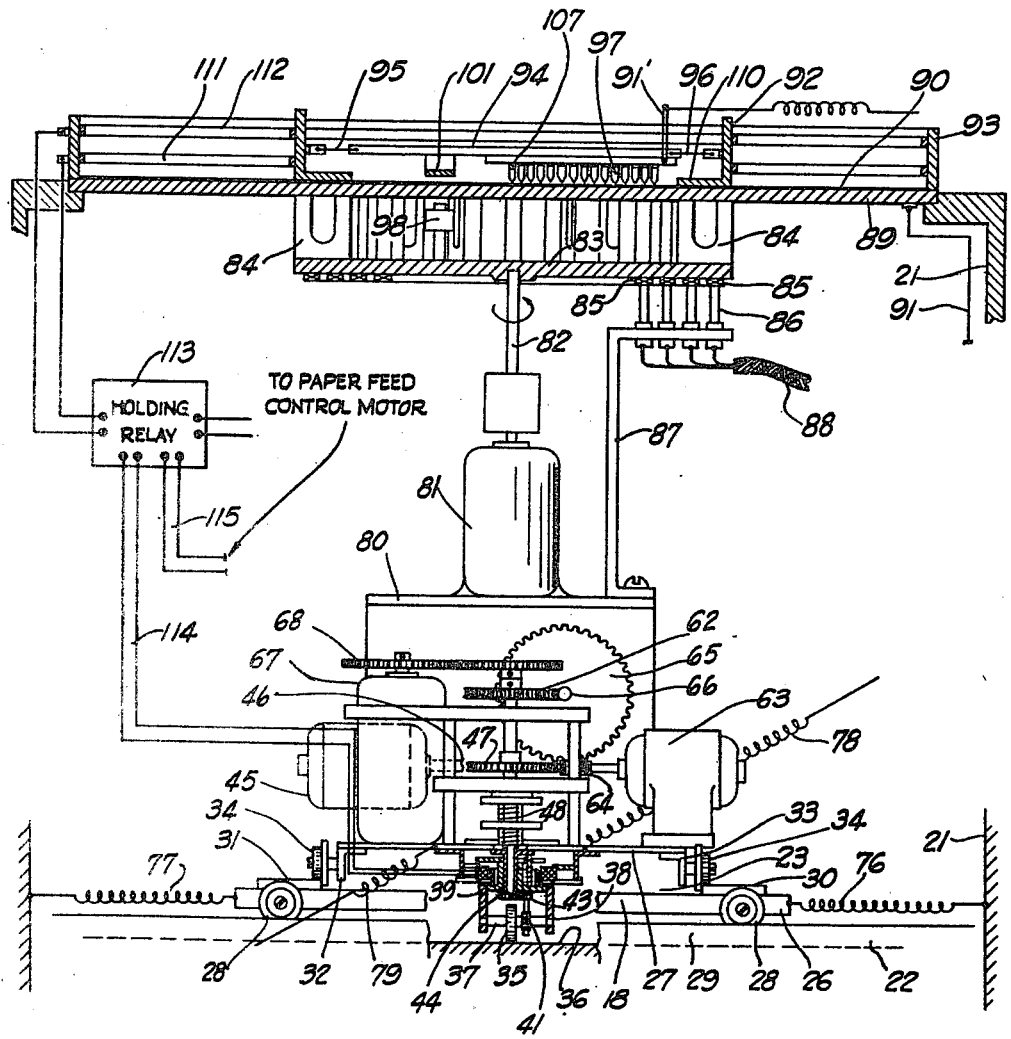
Fig. 2 shows in elevation the indicating system partly in fragmentary section.
Figure 5:
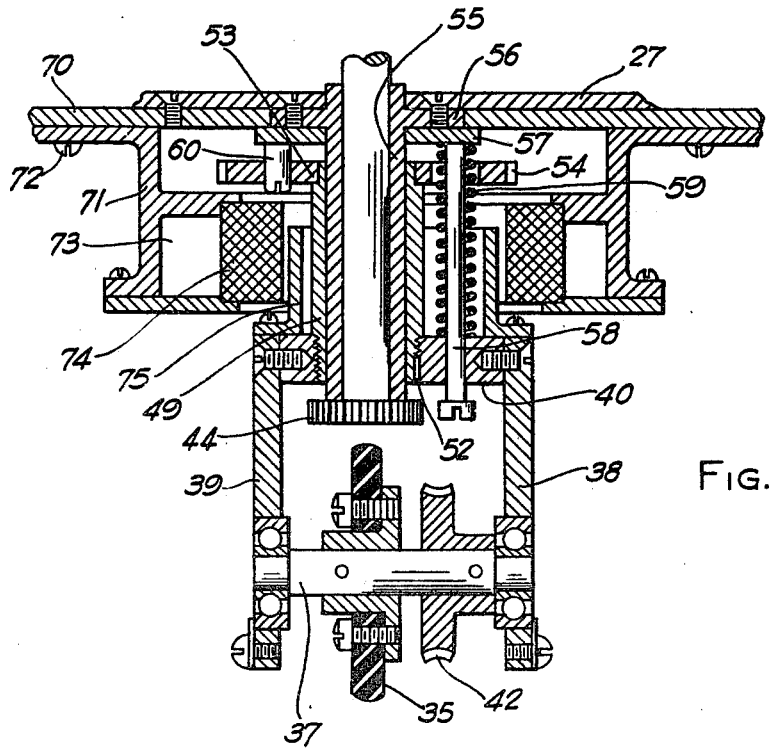
Fig. 5 shows a detail and cross section.
Figure 4:
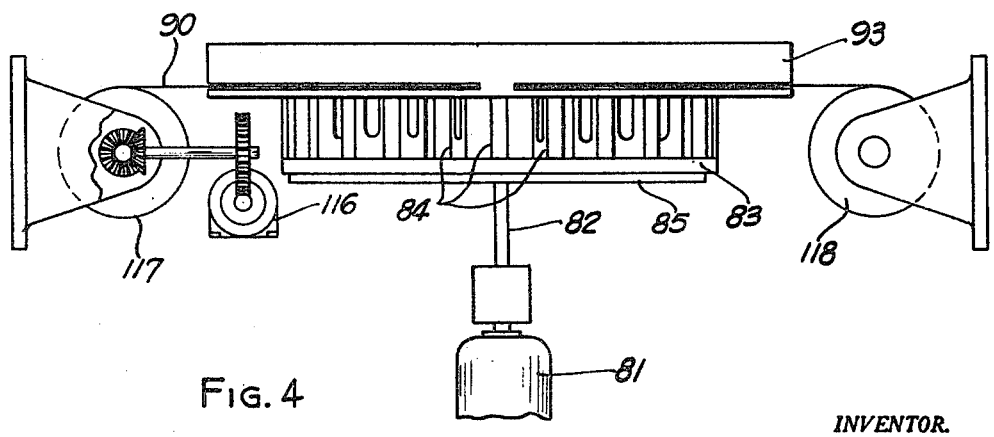
Fig. 4 shows a side view of a part of the device indicated in Fig. 2.

The recording indicating system with the control apparatus for plotting the course of the observing ship and the submarine is illustrated somewhat diagrammatically in Figure 2 with further details in Figures 3, 4 and 5.

In Figure 2 there is provided a frame 21 having a platform 22 provided with a friction bearing surface 36 faced with cork or "corprene" or the like over which the device 23 for simulating the movement of the observing vessel moves as will be explained later. This device has two independently movable trucks or carriages 26 the lower one, and 27 which moves on the lower one at right angles to the movement of the lower truck as will be presently explained. The lower truck 26 is built of two parallel supports 18 on which are mounted four wheels 28 which roll along two parallel guide rails or beams 29 on the lower frame 22.

Figure 10:
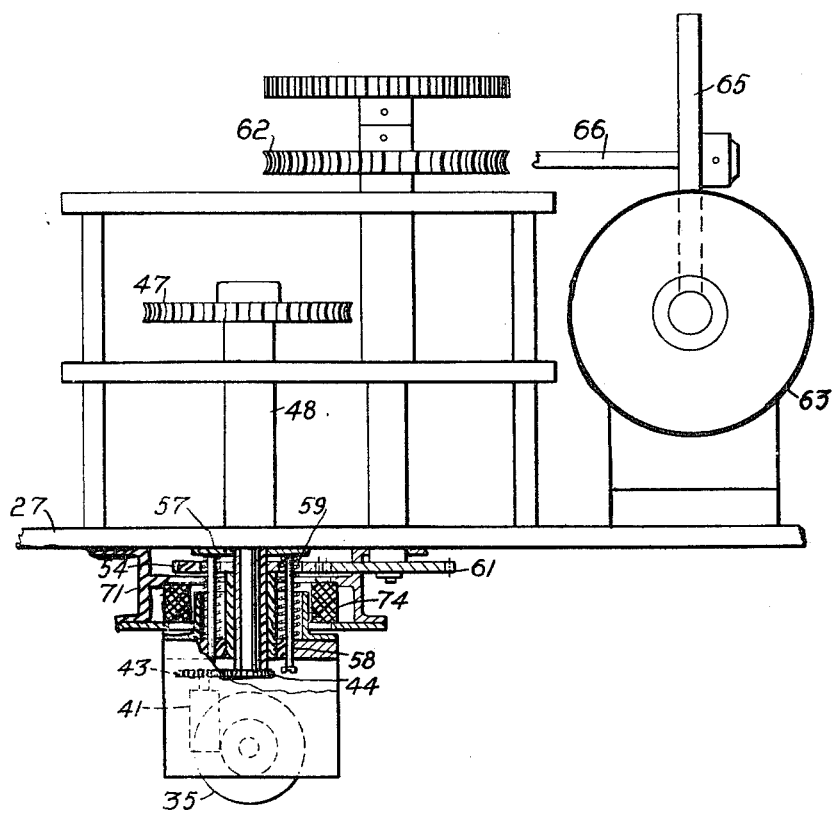
Fig. 10 shows in elevation and partly in fragmentary section a portion of the indicating system shown in Figs. 2 and 5, the section being taken at right angles to the sections in Figs. 2 and 5.

On the truck 26 there are provided two cross-supports 30 and 31 which bear the upper truck 27. The upper truck 27 is provided with L beams 32 and 33 carrying the truck wheels 34 which move on the supports or guide rails 31 of the lower truck 26. The wheels 28 and 34 all have flanges bearing against the edges of the guide plates or rails on which they are supported so that the movement of the wheels will always be guided along the edge of the beam supports. It will readily be seen that since components of motion are provided in two directions at right angles to each other, a variation of velocities will produce motion in any desired direction. The drive is obtained by a single driving wheel 35 which bears against the friction surface 36 with just sufficient pressure for a non slipping drive without permitting the entire weight of the carriages to rest on the driving wheel 35. This is obtained by permitting the trucks to be supported on the rails and providing spring pressure for forcing the driving wheel 35 down against the friction surface 36. The wheel 35 is mounted on the shaft 37 which is journaled at both ends on supporting brackets 38 and 39 which extend downward from a horizontal plate 40 forming an inverted U-shaped bracket for carrying the bracket wheel. The shaft 37 is driven by a worm 41 and a worm wheel 42, see Fig. 5, the latter mounted on the shaft 37. The worm wheel 41 is driven by a gear 43 which, in turn, is driven by the gear 44. The gear 44 is driven by the motor 45 which is run at such a speed of rotation that the drive of the wheel 35 on the friction surface 36 will correspond to the vessel's speed. The motor 45 drives the gear 44 through a worm and worm gear drive 46 and 47, respectively, which drives the shaft 48 on which the gear 44 is mounted. This arrangement is similar to that shown in the copending application of W. G. Gorton et al. Serial No. 483,226, filed April 15, 1943. The course of the vessel is controlled in the same manner as described in this copending application. In this case the supporting bracket or plate 40 is rotated about a vertical axis to maintain the direction of the driving wheel in the same direction as the heading of the vessel. The plate or bracket 40 is supported for free motion by a sleeve 49 surrounding the shaft 48. This construction as well as the means for raising the whole U-shaped inverted carriage made up of the elements 38, 39 and 40 is shown more clearly in Figs. 5 and 10.

The plate 40 is threaded to receive the end of the sleeve 49 to which it is pinned in place by a pin 52. At the top end of the sleeve 49 there is provided a shoulder 53 upon which the spur gear 54 is fixed. The sleeve 49 rotates about a second sleeve 55 which surrounds the shaft 48. This sleeve 55 has at its top end an outwardly extending flange 56 by which it is held to the frame of the truck 27. Bearing against the flange 56, but not fixed to it, is a ring 57 which carries three long studs 58 which extend through holes in the plate 40. These studs are each surrounded by springs 59 which exert a pressure between the top of the plate 40 and the bottom of the plate 57 tending to force these two elements apart. The plate 57 is also locked with the gear 54 by means of screws 60 which extend through holes in the disc of the gear 54. The result of this construction is that the springs 59 force the structure carrying the driving wheel 35 downward against the floor 36 and at the same time the shaft 48 drives freely the wheel arrangement previously described. In addition to this, the plate 57 is freely turned by means of the pins 60 engaging the disc of the gear 54 so that the rods 58 maintain their same position with respect to the gear 54. The shaft 37 on which the wheel 35 is journaled will be rotated in a horizontal plane by rotation of the plate 40. Carried by the supporting truck 27 is also a plate 70 to which is attached a bracket 71 by means of screws 72. The bracket 71 carries a frame or spider 73 surrounding the collar 49 which carries the supporting inverted U-shaped member in which the wheel 35 is journaled. This spider carries a solenoid coil 74 and surrounding the collar or sleeve 49 and attached to the top of the plate 40 is a tubular core element 75 of magnetizable material which is adapted to be operated within the solenoid coil 74 so that when the latter is energized, the armature or core 75 will be lifted upwards against the action of the springs 59. This will raise the wheel 35 from its friction contact with the floor 36 and will permit the two trucks 26 and 27 to be moved freely on the guide rails 29 and 30. The truck 26 is at each end connected to two long helical springs 76 and 77 which when the wheel 35 is raised, act to center the truck on the floor. Similarly two other springs 78 and 79 are provided for the trucks 27 and these springs act in a similar way to center the truck 27 on the platform or floor when the wheel 35 is raised. The whole mechanism shown in Fig. 2 is therefore returned to the center of the platform.

The control and operation of the coil 74 is obtained through means which will later be described, the purpose of the whole arrangement being to bring the mechanism simulating the searching vessel back to the center of the board after it has gone out to the edge.

The motor 63 controls the direction of heading of the wheel 35. This motor drives the worm reduction system comprising the worm 64, the worm gear 65, the worm 66 which drives the gear 62. The gear 62 drives a shaft on which is mounted a gear 61 which meshes with gear 54 whereby the direction of heading of wheel 35 is controlled (see Fig. 10). The motor 63 is driven in accordance with the heading of the vessel and if desired a repeater system may be obtained by the use of a repeater motor 67 connected to the gear 62 through the gear 68.

The platform 27 carries a plate 80 on which a motor 81 may be mounted which rotates through a reduction gear or otherwise a shaft 82 which is directed in the same direction as the receiving projector 8 of Fig. 1. The diagrammatic arrangement for this is shown more specifically in Fig. 8 and will be explained later.

The shaft 82 carries a plate 83 on which are mounted annularly on the plate a group of permanent magnets 84 of the horseshoe type. On the underside of the plate 83 there are mounted a group of commutator rings 85 which contact with brushes 86 mounted on the bracket 87 attached to the plate 80 carrying the motor 81 which is of the self synchronous type. A fixed flexible cable 88 containing the necessary power supply and operating wires connect to the bracket 87 and conduct to the brushes 86 the proper operating currents to operate the recording apparatus situated on the table 89. This table 89 is supported by the frame 21 and preferably is a non-magnetic conducting plate as, for instance, manganese nickel steel, aluminum, copper or the like. The plate 83 with the magnets 84 is positioned so that the magnets are practically but not actually in face contact with the bottom of the plate 89. The table 89 is covered with a recording paper 90 of the type commonly used in depth sounding or echo ranging work. This paper is a conductive paper which becomes black when a current is passed through it between the conducting electrodes which will be described later and the conducting plate 89 which serves as an electrode. A wire 91 connected to the bottom of the plate 89 may be used as a ground contact or as a connecting wire to one end of the indicating or receiving circuit.

The paper 90 during any one set of operations of the system is stationary on the plate 89. However, when the carriage 92 containing the recording elements come up against the side fences 93, a contact is made which changes the paper as will be presently described.

The carriage 92 may be circular in shape or it may have any other desired shape such as that of a regular polygon of any number of sides. Spanning the center of the carriage 92 is a bar 94 which is suspended at its ends by a pair of flexible springs 95 and 96 by means of which it is attached to the side walls of the frame 92. The springs 95 and 96 are mounted horizontally such as to permit the vibration of the bar 94 about a horizontal axis. The bar 94 carries a group of reeds 97 which are tuned to the desired audio frequencies which in this case may range from 100 to 200 cycles. These reeds are arranged in order with the lower frequencies at one end and the higher frequencies at the other end, depending upon whether the higher frequencies indicate the greater distance or the shorter distance. Either method of recording may be used, as will be noted from the description in the specification. In the example previously given, the audio frequency used for indication ranges from 100 to 200 cycles. A wider or a narrower frequency range may be used if desired. The tuned reeds 97 are energized through the receiving projector 8 in Fig. 1 through which the proper input voltage is finally impressed upon the magnet 98 which vibrates the armature 101 attached to the bar 94. The frequency of vibration of the bar 94 determines which of the reeds 97 is vibrated. The vibrating reed 97 in its increased motional amplitude makes contact with the paper 90 and thereby a current is permitted to flow from the reed across the paper 90 through the plate 89 to the return or ground connection 91. In this arrangement a conducting wire is brought to the reed bank 97 as illustrated by 91'.

Figure 6:
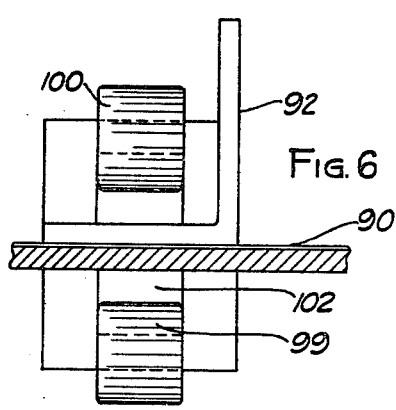
Fig. 6 shows an enlarged detail of a modification.
Figure 7:
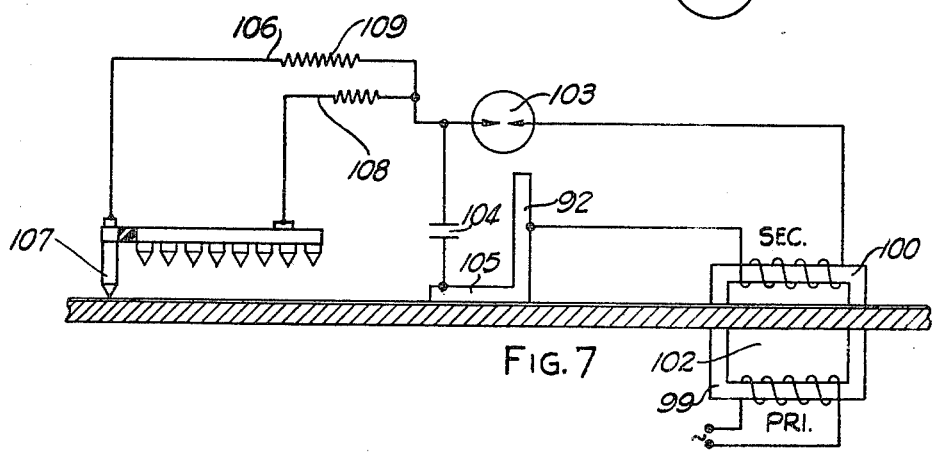
Fig. 7 shows schematically an electrical diagram for the modification of Fig. 6.

Current supply for the marking circuit in another manner is illustrated more clearly in Figures 6 and 7. This current is supplied through a transformer 102 which has a primary 99 situated beneath the plate or table 89 and the secondary 100 positioned above the plate. Alternating high frequency current is supplied to the primary through a pair of the brushes 86 and the secondary 100 is impressed across a cold cathode rectifier circuit comprising a rectifier 103, condenser 104 and the plate element 105 which offers a large surface contact with the recording paper. The output of this rectifier circuit has a lead 106 going to the center marker 107 for the ship's course and another lead 108 going to the reed bank 97. Current-limiting resistors 109 may be used in the circuit.

The frame 92 and the plate 105 may be joined or made of the same piece of material and as shown in Figs. 2 and 7 are right angles in sections.

In the ring 105 which is of non-magnetic material are arranged a plurality of bar armatures 110 which line up and hold position with the magnets 84. The transformer 102 has its secondary 100 mounted in a fixed position in the enclosed frame 92 so that it has its secondary always opposed in position to the primary 99 as indicated in Fig. 6. The actual construction may be as shown in Fig. 6 with the transformer secondary 100 supported by the frame 92 and having its base in contact with the paper 90. The transformer secondary, therefore, will move with the frame 92 while the primary 99 will move with the plate 83. The base 105 of the frame 92, as shown in Fig. 7, is connected to one side of the transformer secondary 100 and the other side is connected through the rectifier to the reed bank and the ship's course so that a circuit for supplying current through the paper is made when the reeds come in contact with the paper.

In the arrangement as described, therefore, whenever a projected signal is made on the projector, a mark for the ship's position will be indicated by the current flowing through the stylus 107 at the center of the frame 92. The frame 92 which has a series of armatures 110 spaced around its periphery is held in exact position by the permanent magnets 84 supported by the plate 83 so that whatever movement the plate 83 makes either in rotation or in translation, a similar motion is made by the frame 92. The plate 83 is moved beneath the table in direct relation to the motion of the observing vessel. This is accomplished, as has been explained, by drives through the motor 45 which correspond to the vessel's speed and direction through the motor 63 which corresponds to the vessel's heading. In order to return the mechanism to the center of the table and the trucks to the center of the platform, a fence 93 is provided about the periphery of the table with two contact rails 111 and 112 which are connected through contact members on the outside of the frame or fence 92 for the indicating mechanism. When the contact rails 111 and 112 are connected by the frame 92 coming to the border or edge of the table, the relay 113 is actuated which puts into operation over the lines 114 or energizes the solenoid coil 74 thereby raising the friction wheel 35 off of the floor 36 and permitting the trucks 26 and 27 to roll freely on the guide rails 29, 30, and 31 so as to return the plate 83 and the rest of the mechanism beneath it to the center of the structure.

At the same time that this occurs, the paper feed motor 116 is operated through the line 115, Fig. 4, for a given time interval so that a new stretch of paper is pulled over the plate 89. For this purpose the relay 113 may be a holding relay so that the motor is on for a sufficient time so that the new sheet will be presented on the table. In this way after the carriage or frame 92 has progressed to the edge of the table, it is immediately brought back to the center again on a fresh paper so that observations may continue uninterrupted. The paper feed motor 116 may operate through a worm drive, a roll 117 which winds the paper from a supply roll 118.

Figure 8:
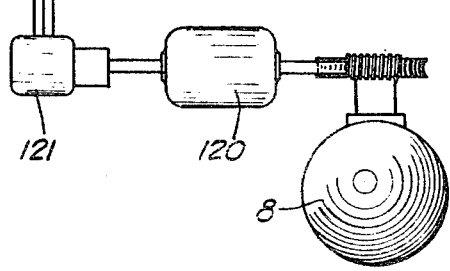
Fig. 8 shows a diagrammatic representation of the system indicating the electrical interconnection of elements.

For the measurement of distance and direction a signal is sent out on the transmitting projector 1. This in accordance with Fig. 9 is sent out in a pattern illustrated by the curve 2 in which the receiving projector is in a blind spot or dead space for the sound pattern of the projector. The projector 8 may be rotated as indicated in Fig. 8 by a motor 120 which has a self-synchronous motor 121 (which may be of the Selsyn type) connected to the second self-synchronous motor 81. The motor 81, as indicated diagrammatically in Fig. 8, drives the table 83 which has the holding magnets 84 positioned on it. The frame 92 will therefore be rotated and translated in the same manner in which the plate 83 is moved, the bar 94 holding the same direction as the direction in which the receiving projector is faced. When the signal, therefore, excites the receiving projector and operates the proper reed corresponding to the heterodyned frequency, a record will be made by this reed which will be in the direction from the record made by the stylus 107 corresponding to the facing of the receiving projector or the direction in which the projector is sensitive. Therefore, the record made at each instant will be such as to indicate both the distance and the direction of the target from the observed vessel.

The transmitting projector may send out a continuous signal or it may send out a signal for a given time interval and be silent while the receiving projector 8 is rotated. The sensitivity of the receiving beam of the projector 8 is indicated by the angle $a$ of Fig. 9. This may be chosen greater or smaller in accordance with the purpose for which the observations are to be made.

As previously explained, the distance will be determined by the specific frequency produced by the frequency actuated range indicator 14 and preferably this frequency will range between 100 to 200 cycles and in the example explained zero distance will be measured by the 200 cycle note and the maximum range by the 100 cycle note.

Having now described my invention, I claim:

1. A system for detecting and measuring the distance to a reflecting object and its direction comprising means for transmitting simultaneously throughout an area to be searched a beam of wave energy in the form of a carrier wave of high frequency and an amplitude modulated side band varying continually in frequency at a linear rate, means for receiving the wave energy after reflection from an object, said receiving means having a relatively narrow directional characteristic, means for rotating said receiving means to pass its directional characteristic through said area to be searched, means for producing from the received signal a resultant signal having a frequency which is a function of the difference between side band of the received signal and the side band being transmitted at the instant the former is received, frequency responsive recording means for indicating thereby the distance of the reflecting object and means for rotating said recording means in synchronism with said receiving means for simultaneously indicating the direction of the reflecting object.

2. A system for detecting and measuring the distance to a reflecting object and its direction comprising means for transmitting simultaneously throughout an area to be searched a beam of wave energy in the form of a carrier wave of high frequency and an amplitude modulated side band varying continually in frequency at a linear rate, means for receiving the wave energy after reflection from an object, said receiving means having a relatively narrow directional characteristic, means for rotating said receiving means to pass its directional characteristic through said area to be searched, means for producing from the received signal a resultant signal having a frequency which is a function of the difference between side band of the received signal and the side band being transmitted at the instant the former is received a plurality of frequency responsive recording elements each individually tuned to a different frequency adapted to be selectively operated by the resultant signal for indicating thereby the distance of the reflecting object, means mounting said recording element in a straight line and means for rotating said mounting means and said recording elements in synchronism with said receiving means for indicating the direction of the reflecting object.

3. A system for measuring the distance to a reflecting object comprising means for transmitting a carrier wave of high frequency and an amplitude modulated side band varying continually in frequency at a linear rate, means for receiving the wave energy after reflection from the object whose distance is to be measured, means for demodulating the received signal, and combining the demodulated signal with the modulating frequency being transmitted at the instant of reception of the received signal, means for demodulating the combined frequencies, and combining the frequency from said second demodulation with a fixed frequency by heterodyne action, and frequency responsive means for indicating thereby the distance of the reflecting object.

4. A system for measuring the distance to a reflecting object comprising means for transmitting a carrier wave of high frequency and an amplitude modulated side band varying continually in frequency at a linear rate, means for receiving the wave energy after reflection from the object whose distance is to be measured, means for demodulating the received signal, and combining the demodulated signal with the modulating frequency being transmitted at the instant of reception of the received signal, means for demodulating the combined frequencies, and combining the frequency from said second demodulation with a fixed frequency by heterodyne action, and a plurality of frequency responsive means each individually tuned to a different frequency adapted to be selectively operated by the resultant signal for indicating distance of the reflecting object.

EDWIN E. TURNER, Jr.

REFERENCES CITED

The following references are of record in the file of this patent:

UNITED STATES PATENTS

| Number | Name | Date |
|---|---|---|
| 2,253,975 | Guanella | Aug. 26, 1941 |
| 2,118,518 | Neumann | May 24, 1938 |
| 2,108,089 | Turner | Feb. 15, 1938 |
| 2,268,587 | Guanella | Jan. 6, 1942 |
| 1,993,326 | Hart | Mar. 5, 1935 |